(12) United States Patent
Stimson

(10) Patent No.: US 7,763,296 B2
(45) Date of Patent: Jul. 27, 2010

(54) FOOD ITEMS, SYSTEMS AND METHODS

(76) Inventor: Judith N. Stimson, 3538 Bay Road South Dr., Indianapolis, IN (US) 46240

( * ) Notice: Subject to any disclaimer, the term of this patent is extended or adjusted under 35 U.S.C. 154(b) by 1121 days.

(21) Appl. No.: 11/305,841

(22) Filed: Dec. 16, 2005

(65) Prior Publication Data
US 2006/0216387 A1    Sep. 28, 2006

Related U.S. Application Data

(60) Provisional application No. 60/636,831, filed on Dec. 16, 2004.

(51) Int. Cl.
    *B65D 81/32*    (2006.01)
(52) U.S. Cl. .................. 426/115; 426/90; 426/120; 426/123; 426/143; 426/390; 426/391; 426/392; 426/394; 426/410
(58) Field of Classification Search .......... 426/89, 426/94, 95, 100, 101, 112, 119, 120, 122, 426/123, 124, 126, 127, 113, 115
See application file for complete search history.

(56) References Cited

U.S. PATENT DOCUMENTS

| 1,854,224 A | 4/1932 | Rankin |
| 1,936,835 A | 11/1933 | Fairchild |
| 3,410,691 A | 11/1968 | Stanley |
| 4,303,690 A | 12/1981 | Haas, Sr. et al. |
| 4,313,964 A | 2/1982 | Dembecki |
| 4,390,553 A | 6/1983 | Rubenstein et al. |
| 4,444,795 A * | 4/1984 | Weinstein ............ 426/90 |
| 4,463,021 A * | 7/1984 | Eufemia ............ 426/90 |
| 4,821,906 A | 4/1989 | Clark |
| 4,859,476 A | 8/1989 | Herting |
| 4,910,030 A | 3/1990 | Trojahn |
| 4,915,964 A | 4/1990 | Smietana |
| 5,009,902 A | 4/1991 | Mercenari |
| 5,223,286 A | 6/1993 | Selbak |
| 5,298,273 A | 3/1994 | Ito |
| 5,518,748 A | 5/1996 | Ito |
| 5,538,744 A | 7/1996 | Miller et al. |
| 5,626,897 A | 5/1997 | Goldstein |

(Continued)

*Primary Examiner*—Steve Weinstein
*Assistant Examiner*—Chaim Smith
(74) *Attorney, Agent, or Firm*—Woodard, Emhardt, Moriarty, McNett & Henry LLP

(57) ABSTRACT

Described is a cone-shaped food item and systems and methods for packaging and dispensing the same. A preferred food item includes a cone-shaped edible food element such as a cone-shaped waffle, a cone-shaped external wrap for covering the food element, a foodstuff filling received within the edible food element, and a lid for covering an open upper end of the food element. Systems for assembling and dispensing the food item can include assembling the food element and optionally storing the food element originally in an inverted position wherein the foodstuff to be received internally of the cone-shaped food element is originally contained within the lid and thus not in substantial contact with the waffle or other conical food element. This can help to maintain the integrity of the cone-shaped food element during assembly and maintenance prior to distribution to consumers. Thereafter, for example upon serving the food item to a consumer, the food item is manipulated to its upright position whereupon the foodstuff is deposited by gravity into the interior volume of the cone-shaped waffle or other food element.

15 Claims, 6 Drawing Sheets

U.S. PATENT DOCUMENTS

| | | |
|---|---|---|
| 5,916,611 A | 6/1999 | Bell |
| 2003/0044493 A1 | 3/2003 | Rettey et al. |
| 2003/0185943 A1 * | 10/2003 | Bradley et al. .............. 426/115 |

* cited by examiner

FOOD ITEMS, SYSTEMS AND METHODS

REFERENCE TO RELATED APPLICATION

This application claims the benefit of priority of U.S. Provisional Patent Application Ser. No. 60/636,831 filed Dec. 16, 2004, which is hereby incorporated herein by reference in its entirety.

BACKGROUND OF THE INVENTION

The present invention relates generally to food items, and in one particular aspect the present invention relates to cone-shaped food items and systems and methods for assembling, storing and distributing such food items.

SUMMARY OF THE INVENTION

Accordingly, in one aspect of the invention, provided is a food item that includes a cone-shaped waffle, a corresponding cone-shaped exterior wrap to cover the waffle, and a lid/container for covering an open upper end of the cone-shaped waffle and potentially storing the foodstuff. Received within the waffle is a foodstuff and in one particular aspect of the invention a breakfast foodstuff such as one including eggs. In one mode of assembling and dispensing this food item, the elements can be assembled and stored in an inverted condition, wherein the foodstuff to be received in the waffle is contained in the lid, with the waffle and waffle wrap received thereupon. In this manner, the waffle can be protected against the undesirable infusion of moisture which might occur if the food item were stored with the foodstuff received within the waffle. As well, the combination of the lid and exterior waffle wrap can in some embodiments of the inventions serve as a relative moisture barrier, such that the food item can be stored under heated conditions, e.g. under a food lamp, without deleteriously rapid loss of moisture which would make the food item undesirable for consumption. In other aspects, the lid may contain a relatively flat surface which may serve as the resting surface when the food item is its inverted condition. In this manner, the food item can be conveniently stored upon a flat surface prior to and during service to a consumer.

In another embodiment, the present invention concerns a method for providing a food item including a cone-shaped waffle and an interior foodstuff. The method includes providing a lid element containing the foodstuff to be received within the waffle, the lid element being in an inverted position. The cone-shaped waffle and optionally a wrap element are provided received upon the inverted waffle lid. With the assembled food item in this inverted condition, the item is manipulated to its upright orientation whereupon a foodstuff received in the lid falls into an interior volume of the cone-shaped waffle. Thereupon, the food item can be served to a customer or other consumer. As well, the food item can be served to the consumer/customer in its inverted condition, and then manipulated to its upright position by the consumer/customer.

In still another embodiment of the invention, provided is a cone-shaped waffle food item that includes a soft, malleable waffle sheet wrapped upon itself to form a cone shape, having portions of the waffle overlapping itself. A waffle wrap element is received around the malleable waffle sheet and assists in retaining the cone shape of the wrapped waffle. A foodstuff, such as an egg-based foodstuff, is received within the interior of the waffle. In one embodiment, this food item also includes a lid covering an open upper end of the waffle. This lid is optionally removable by a consumer to consume the foodstuff.

In still other embodiments of the invention, provided are systems and methods for distributing food items as described herein.

Additional embodiments of the invention as well as features and advantages will be apparent to those skilled in the art from reading the descriptions herein.

DESCRIPTION OF THE PREFERRED EMBODIMENTS

Figure 1:
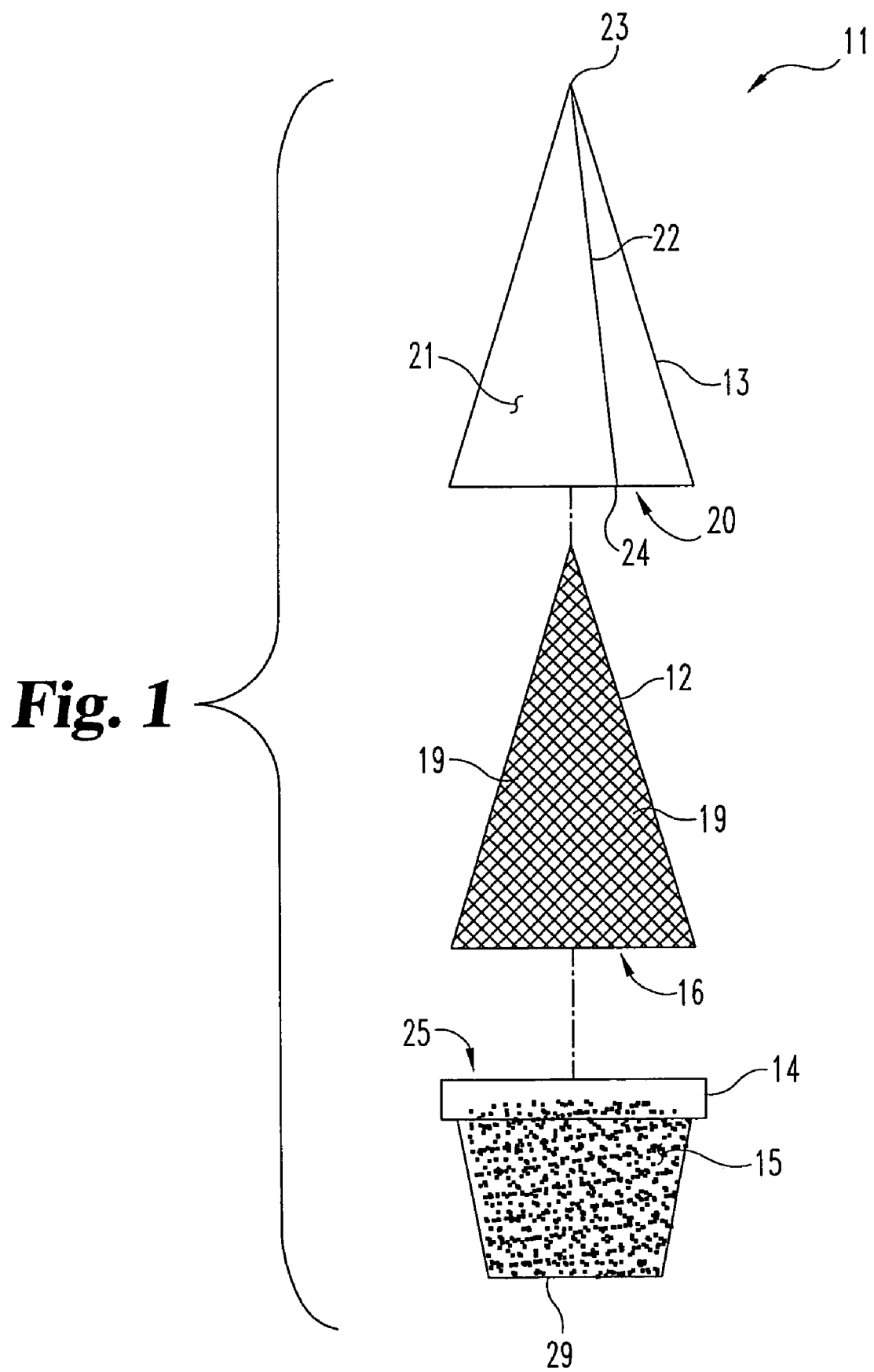
FIG. 1 provides an exploded view of a cone-shaped waffle food item of the invention.
Figure 2:
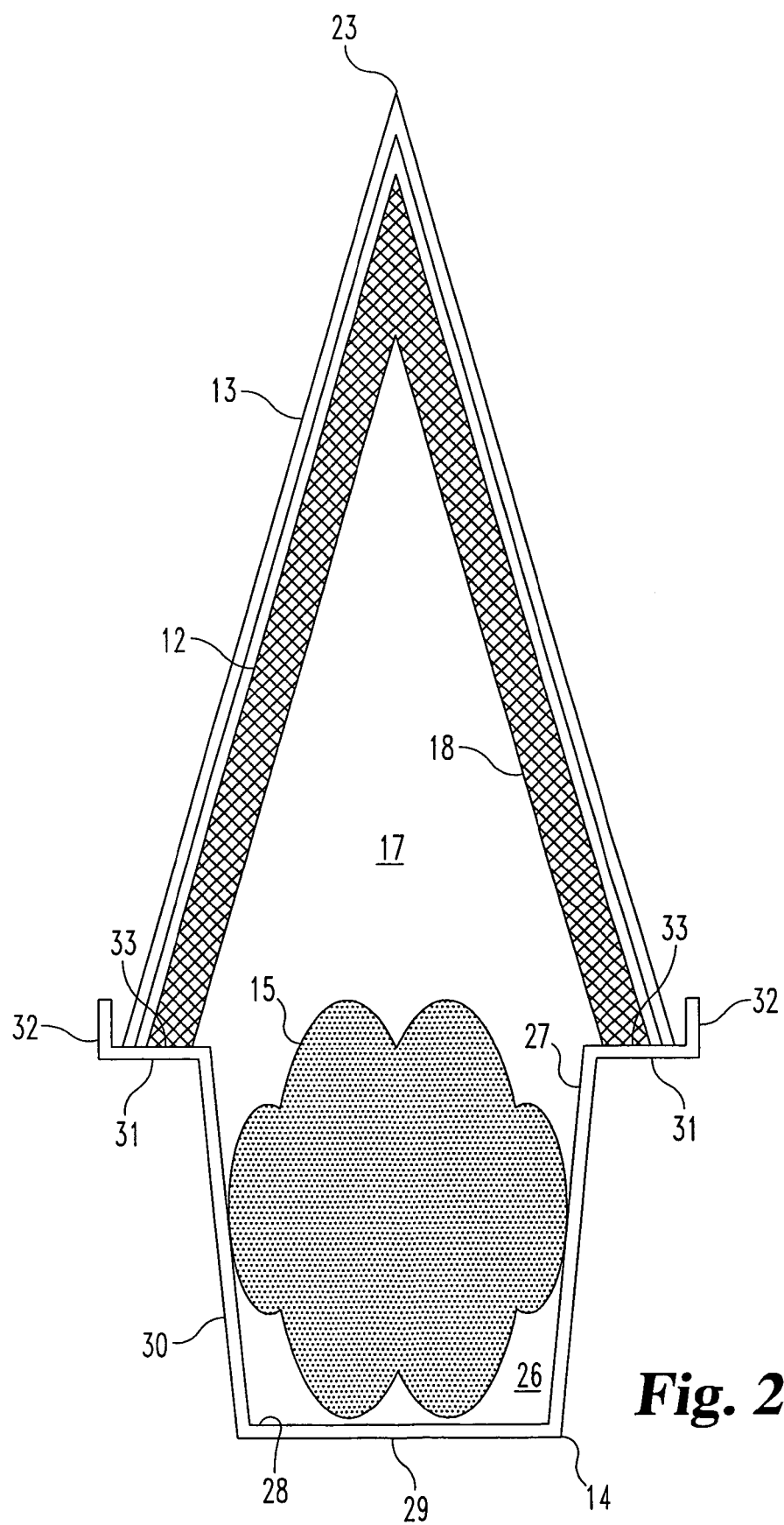
FIG. 2 provides a cross-sectional view of the assembled food item of FIG. 1 taken through a central vertical plane.
Figure 3:
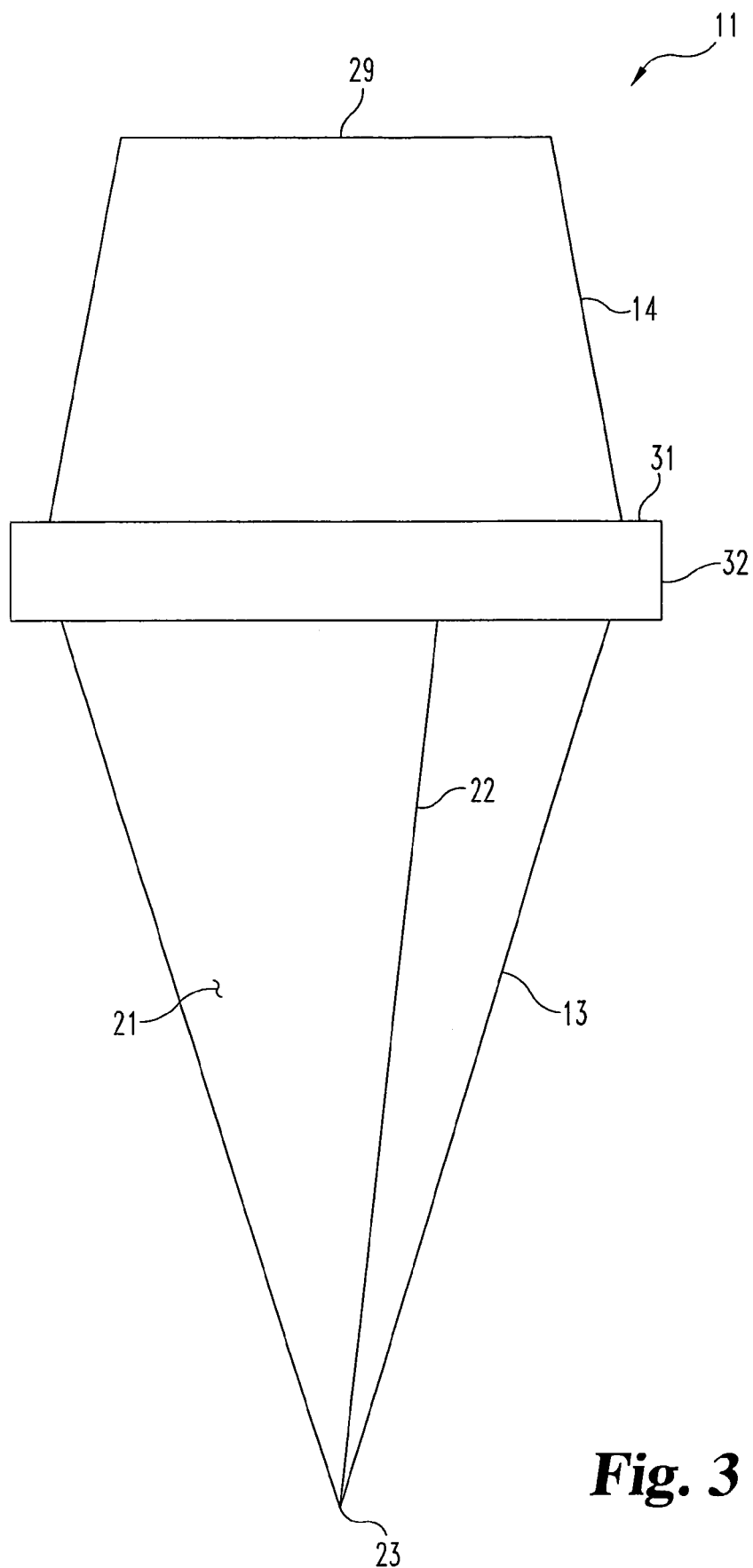
FIG. 3 provides a side view of the assembled food item of FIG. 1.
Figure 4:
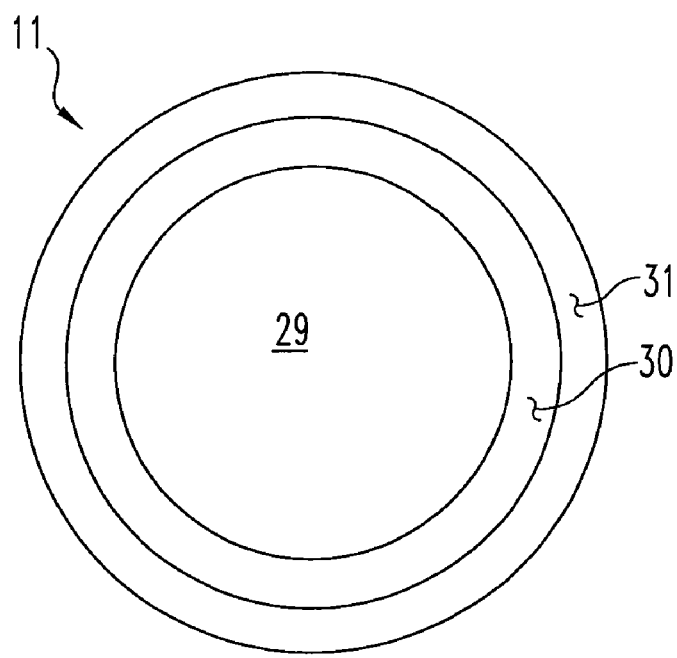
FIG. 4 provides a bottom view of the assembled food item of FIG. 1.
Figure 5:
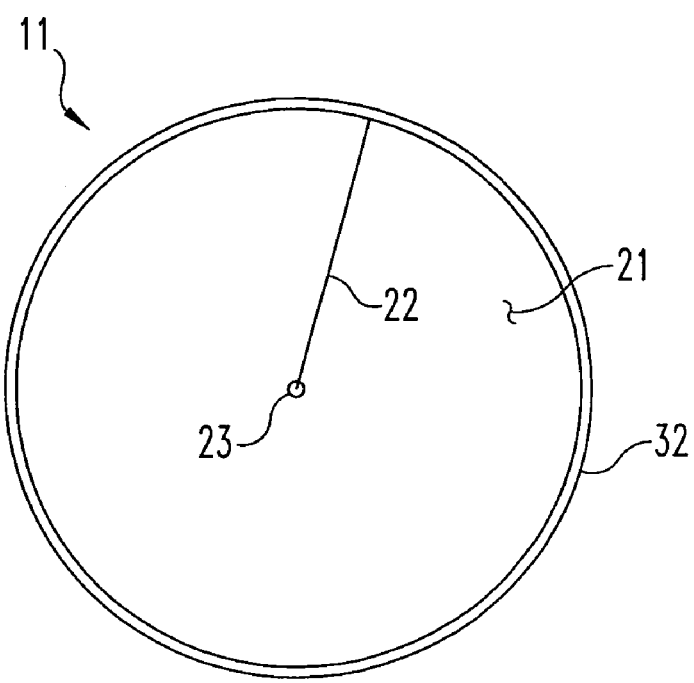
FIG. 5 provides a top view of the assembled food item of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

As disclosed above, the present invention provides food items and related systems and methods for their assembly and distribution to consumers. In certain embodiments of the invention, food items include a cone-shaped edible food element such as a waffle, a non-edible external wrap, and a non-edible lid for covering an opening at the upper end of the cone-shaped edible food element can be used to store and serve the foodstuff. A foodstuff is received within the edible cone-shaped food element. In certain preferred aspects of the invention, the foodstuff is one traditionally served at breakfast and in certain embodiments is an egg foodstuff. Other aspects include food items used for other meals as well as snacks and desserts.

In methods of assembling such food items, they can be provided in the inverted condition, wherein the foodstuff to be received within the inner volume of the cone-shaped edible food element is received and contained within the non-edible lid. Upon reverting the food item to its upright position with the opening of the cone-shaped edible food element positioned upwardly, the foodstuff falls from the lid into the cone-shaped edible food element. Thereafter, the lid can be removed and both the foodstuff and the cone-shaped edible food element can be consumed. In one aspect, an external wrap of the food item is a spiral-manufactured and/or perforated paper or plastic cone, which is adapted to be peeled away from the edible cone-shaped food element as the edible portions of the food item are consumed. Other peel-away arrangements for the cone or other external wrap can of course also be used.

With reference now to FIGS. 1-5 taken together, an illustrative cone-shaped food item of the invention is depicted. Food item 11 includes a cone-shaped edible food element 12, an external wrap 13, and a lid 14. Food item 11 further includes an edible foodstuff 15, desirably either relatively malleable or particulate in nature, which is ultimately received within the cone-shaped food element 12 during consumption.

Cone-shaped edible food element 12 includes a relatively large opening 16 for receiving the foodstuff 15 into an interior volume 17 thereof. Cone-shaped food element 12 includes an inner surface 18 against which the foodstuff 15 will reside. In this regard, inner surface 18 can optionally provide a moisture barrier such as a densified layer, or a coating of a relatively moisture-resistant material such as an edible gum or wax or chocolate. Cone-shaped food element 12 can be made from a variety of food materials but is advantageously a baked item made from a flour-based dough that may, for example, include other conventional dough ingredients such as baking powder, salt, sugar, egg components, oil(s), liquids such as water and/or milk, or other ingredients. As well, the dough may incorporate flavoring agents varied to provide compatibility with the foodstuff 15 filling the interior volume 17 of the food element 12. Cone-shaped food element 12 is desirably a cone-shaped waffle and thus includes a waffling pattern 19 (e.g. including a plurality of patterned, raised shapes such as squared) at least on its exterior surface and in certain embodiments on both its exterior and interior surfaces. The thickness of the food element 12 may vary. In typical food items 11, such thickness will be from about one-sixteenth of an inch ($1/16$") to about one-half inch ($1/2$"). More typically, for crisp waffles or other food elements 12, the thickness will be up to about one-fourth of an inch ($1/4$"), and for soft, malleable waffles the thickness will be between about one-eighth of an inch ($1/8$") and about one-half inch ($1/2$"). Cone shaped food element 12 may be provided its cone shape by a molding/baking procedure in which the element 12 is baked between male and female mold pieces, or by configuring a sheet of food material into a generally conical shape and, optionally, attaching portions of the configured sheet to one another to assist in retaining the conical shape. Any such attachment can be achieved by any suitable means including the use of edible bonding materials or removable attachment elements such as paper or plastic pins, clips or the like.

Turning now to a discussion of the wrap 13, it includes a relatively large opening 20 for receipt of the cone-shaped food element 12. Wrap 13 further includes walls 21 which generally converge toward one another in a direction extending from opening 20. In certain embodiments of the invention, wrap 13 is manufactured from sheet material such as sheet paper, which has been spirally wrapped upon itself. In this embodiment, wrap 13 will include a sheet edge 22 extending from its open end 20 to its opposite end 23. Opposite end 23 can have a completely closed condition, or can in certain embodiments of the invention be slightly open but of a size smaller than opening 20. In one preferred embodiment, wrap 13 having sheet edge 22 can be peeled away from cone-shaped food element 12 as it is consumed, for example starting with an upper edge tab or corner portion 24 of the wrap 13. Alternatively, element 22 can represent a line of perforations in the wrap 13 adapted for peeling the wrap 13 away as food element 12 and its interior foodstuff contents 15 are consumed. The wrap 13 can be made from any suitable material, including for example paper and/or plastic materials. When made from paper, wrap 13 can optionally include coating or impregnation materials that increase its resistance to moisture penetration. A moisture-resistant wrap 13 will be particularly advantageous where food element 12 contains a moist foodstuff 15 and is not itself sufficiently resistant to liquid leakage, e.g. where a small opening may exist at the bottom or point 23 of food element 12 and/or where the walls of food element 12 are porous to an extent that allows liquid leakage therethrough. In addition, in accordance with certain inventive aspects, the wrap 13 need not have a full, conical shape but can rather be a band or strap of material received around cone-shaped food element 12 which can for example assist in holding the food element 12 and/or assist in maintaining a conical shape to food element 12.

Turning now to a discussion of the lid 14, in the illustrated embodiment it includes a relatively large opening 25 for receiving the foodstuff 15, and for allowing foodstuff 15 to fall into interior volume 17 of cone-shaped food element 12 when food item 11 is placed in its upright position. Lid 14 includes an internal chamber 26 which is desirably of a size sufficient to contain the foodstuff 15, desirably wherein the volume of chamber 26 is sufficient to contain enough foodstuff 15 to substantially fill the cone-shaped food element 12, for example filling at least about 80% of the volume of internal chamber 17, more preferably at least 100% of such volume, and in some embodiments containing sufficient foodstuff 15 to more than fill the chamber 17 of the cone-shaped food element 12. In the preferred embodiment shown, the internal chamber 26 of lid 14 includes converging inner walls 27 which terminate in a relatively flat inner wall 28. Correspondingly, lid 14 can have a lowermost exterior surface 29 (lowermost when the food item 11 is in its inverted position) that is substantially planar or flat, and can thus provide a stable resting surface for the food item 11 in its inverted position. Lid 14 also includes exterior walls 30 which converge in the direction of wall 29 at one end, and which at the other end terminate in a shoulder wall 31 extending transversely to walls 30. Shoulder walls 31 terminate at an opposite end in external walls 32 which extend in a transverse (e.g. perpendicular) direction to shoulder walls 31. Shoulder walls 31 include surfaces 33 which contact the cone-shaped food element 12 and the external wrap 13. In certain embodiments, this contact can form a substantial seal of an interior volume of the food item 11 including chamber 17 of the food element 12 and chamber 26 of the lid 14. In this manner, the food item can resist moisture loss, for example, when maintained for a period of time prior to and/or after distribution to a consumer, including for instance when maintained under heated conditions. A substantial seal of the interior volume of the food item 11 can also facilitate resistance to loss of a temperature condition of the food element 12 and foodstuff 15, for example helping to maintain a cooled or heated condition of these edible portions of food item 11. As well, contact between the surface 33 of lid 14 and the food element 12 can help to maintain the cone shape of food element 12 during storage or handling. The lid 14 can be made from any suitable material including for example paper or plastic materials, and is desirably a relatively rigid, shape-retaining structure. Lid 14 is also desirably resistant to moisture leakage or penetration, and in certain embodiments is made of a transparent or substantially translucent plastic material so that its internal contents can be viewed through walls of the lid 14.

In accordance with the invention, the wrap 13 and/or the lid 14 may also include visible indicia including, for example, decorations, logos or other advertisements (e.g. for an individual or entity in the business of distributing the food items 11 to consumers), or other information concerning the food item product 11.

Figure 6:
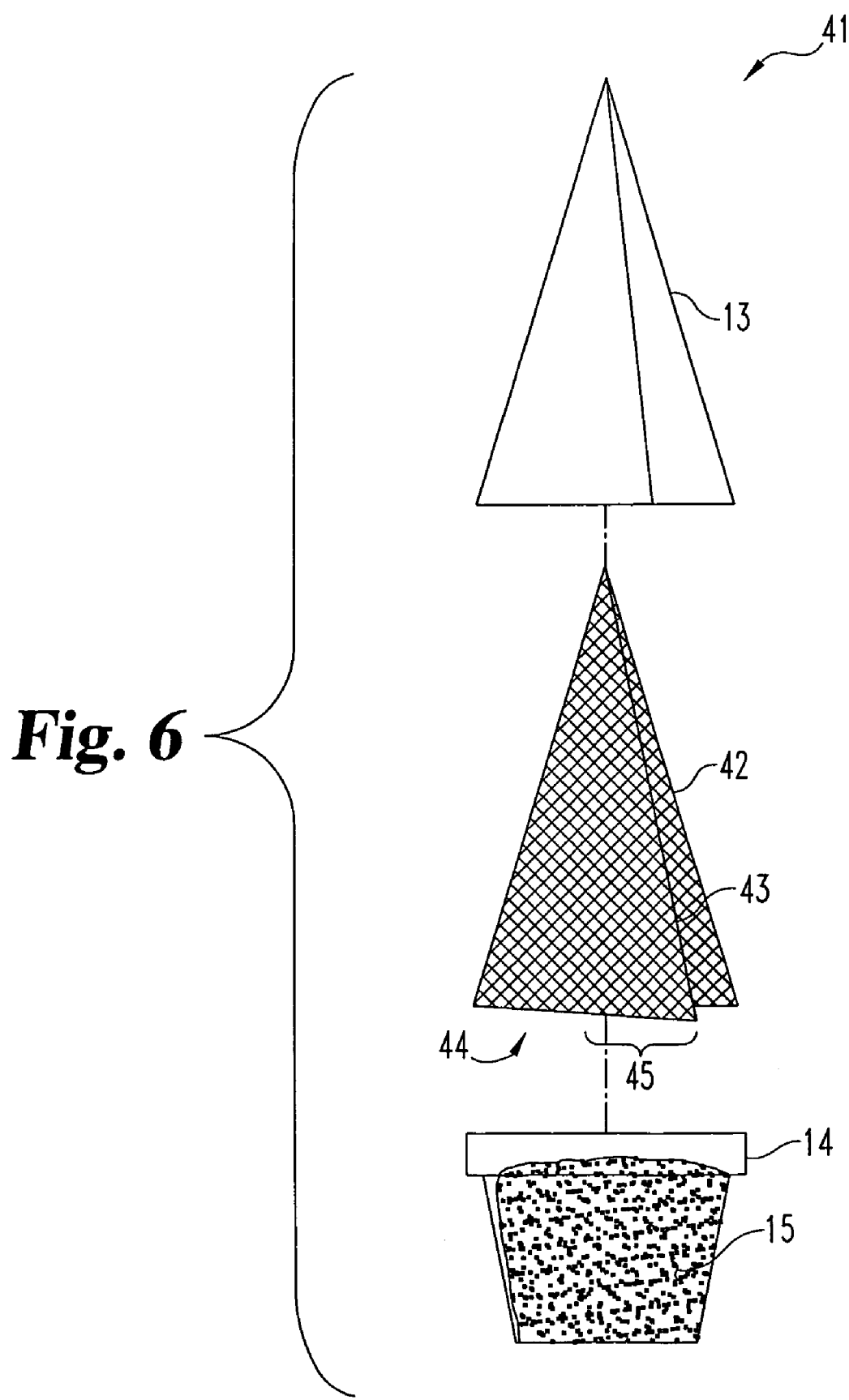
FIG. 6 provides an exploded view of another food item of the invention.

With reference now to FIG. 6, shown is an alternative food item 41 of the present invention. Food item 41 is similar to food item 11 depicted in FIGS. 1-5, except that it includes a cone-shaped food element 42 that is formed from a sheet of a relatively soft, rollable or foldable sheet of edible material, such as a sheet waffle, that is rolled upon itself. Such sheet can have any suitable shape, including for example a circular, rectangular, triangular or trapezoidal shape. Cone-shaped edible food element 42 thus includes a sheet edge 43, a relatively large opening 44 for receiving foodstuff 15, and an overlap portion 45 wherein the sheet foodstuff from which the element 42 is constructed overlaps itself in the formation of the cone shape. In this particular embodiment, external wrap 13 and/or lid 14 facilitate retention of the cone shape during assembly and storage, and after removal of the lid 14, external wrap 13 serves this purpose.

Figure 7:
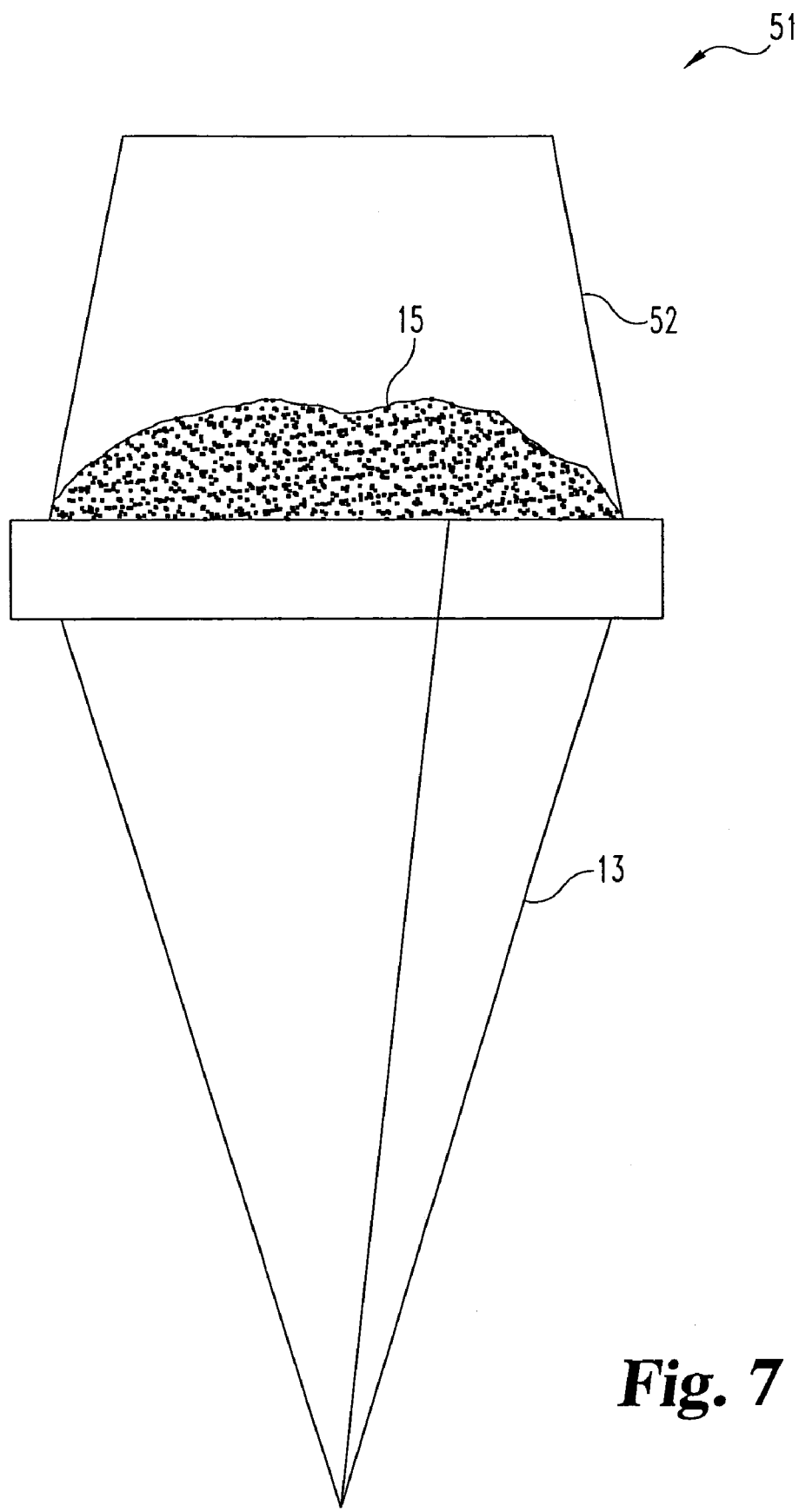
FIG. 7 provides a side view of another food item of the present invention.

With reference now to FIG. 7, shown is another food item 51 of the present invention. Food item 51 can have all aspects described in conjunction with food items 11 and 41 depicted in FIGS. 1-6. In particular in food item 51, lid element 52 is transparent or at least translucent such that the internally-received foodstuff 15 is visible to the consumer when the lid 52 is received upon external wrap 13 and the internal cone-shaped edible food element 12 or 42 (See FIGS. 1-6).

The foodstuff 15 contained in food items 11, 41 or 51 can be any of a wide variety of foodstuffs. Thus, foodstuff 15 can include materials that are traditionally served as warmed, room-temperature or cooled meal-type foods such as egg foodstuffs (including natural eggs and egg substitutes) optionally in scrambled or particulate form, meat products such as bacon or sausage (e.g. particulate bacon and/or sausage, optionally in combination with an egg foodstuff), cheese, meat salads such as chicken salad, cooked (e.g. grilled) or uncooked vegetables, and the like, or combinations of these. Foodstuff 15 may also include dessert foodstuffs such as mousse, fresh fruit, ice cream, chocolate, nuts (including chopped nuts), grated vanilla beans or other relatively sweet foods, or combinations of these.

Food items 11, 41 or 51 can be used in a variety of distribution systems and methods. For example, in one mode, the lid 14 containing the foodstuff 15 can be stored or maintained separately from the food element 12 and wrap 13. For example, the lid 14 containing the foodstuff 15 can be separately maintained in a refrigerated condition; or can be separately maintained in a heated condition and/or quickly heated (e.g. by microwaving) prior to assembly with the food element 12 and wrap 13 and distribution to a consumer. For these purposes, lid 14 containing foodstuff 15 may optionally include a sealing element over its opening, such as a removable sealing foil or other film material, e.g. for storage purposes. In these or other distribution systems/methods, a plurality of pre-assembled food items 11, 41, or 51 can be maintained in an inverted (upside down) condition for distribution to consumers, including for example under heated (e.g. with one or more heat lamps) or cooled temperature conditions (e.g. in a refrigerator or freezer). The food items 11, 41, or 51 can then be delivered to the consumer either after manipulation to their upright position (and consequent deposit of foodstuff 15 from the lid into the food element 12 or 42), or retained in their inverted position such that the consumer can manipulate the item to its upright position, e.g. immediately prior to consumption. As well, in systems wherein the lid 14 includes its own sealing foil or film, which can for instance be peeled away by a consumer, the assembled food items, or disassembled components thereof, can be delivered to the consumer with such foil or film still sealingly intact, such that the consumer can remove or disrupt the foil or film to open the lid 14, assemble the opened lid 14 with the external wrap/cone-shaped food element combination, and turn the assembled item over to drop the contents of the lid into the cone-shaped food element, as generally discussed above.

Food items of the present invention can also be provided in the form of kits containing the various components described above packaged together, so that consumers can assemble the described food items. As noted above, food items of the invention can be distributed at restaurants or the like; however, they may also be distributed through other commercial outlets including for example grocery stores or other food markets, as refrigerated, frozen, or non-perishable (room temperature shelving) goods.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A food item assembly, comprising:
   a cone-shaped, edible food element having a larger first end and a smaller second end, the larger first end providing an opening said cone-shaped edible food element defining a chamber therein, said cone-shaped, edible food element oriented with the smaller second end positioned above the larger first end;
   a cone-shaped wrap covering an exterior surface of said cone-shaped, edible food element;
   a lower lid element covering said opening of said larger first end of said cone-shaped, edible food element, said lid element having an internal chamber having an opening adjacent to said opening of said cone-shaped food element, said lid element comprising a flange around the perimeter of said lid element opening, said larger end of said cone-shaped food element and said wrap being supported by said flange;
   a moisture-containing edible foodstuff received within said internal chamber of said lid element and spaced from said cone-shaped food element, said cone-shaped food element, said edible food stuff, and said internal chamber of said lid being dimensioned and configured such that, said moisture-containing edible foodstuff transferable by gravity into said cone-shaped, edible food element upon inversion of the food item assembly.

2. A food item assembly according to claim 1, wherein said cone-shaped, edible food element comprises a waffle.

3. A food item assembly according to claim 1, wherein said edible foodstuff comprises an egg foodstuff.

4. A food item assembly according to claim 1, wherein said cone-shaped, edible food element has an internal chamber, and wherein said internal chamber of said lid has a volume sufficient to contain an amount of said edible foodstuff that will fill at least about 80% of said internal chamber of said cone-shaped, edible food element.

5. A food item assembly according to claim 1, wherein said wrap is formed with a paper material.

6. A food item assembly according to claim 1, wherein said wrap is formed from a spiraled sheet material.

7. A food item assembly according to claim 1, wherein said cone-shaped edible food element comprises a malleable waffle.

8. A food item assembly according to claim 1, wherein said wrap element is adapted to be manually disrupted during consumption of said cone-shaped edible food element.

9. A food item assembly according to claim 8, wherein said wrap element is cone-shaped and covers substantially an entire exterior surface of said cone-shaped edible food element.

10. A food item assembly according to claim 1, wherein said wrap element has a conical shape.

11. A method for providing a food item assembly to a consumer, comprising:

providing a food item as recited in claim 1 manipulating said food item to a non-inverted position, whereupon said edible foodstuff falls into the internal volume of the cone-shaped edible food element.

12. The method of claim 11, wherein said cone-shaped edible food element comprises a waffle.

13. A method for distributing food items, comprising:

providing a plurality of food item assemblies as recited in claim 1, and maintaining said plurality of food item assemblies in an inverted position as recited in claim 1.

14. The method of claim 13, also including heating said plurality of pre-assembled food items.

15. The method of claim 13, also including cooling said plurality of pre-assembled food items.

\* \* \* \* \*